(12) United States Patent
Murata (10) Patent No.: US 9,482,305 B2
(45) Date of Patent: Nov. 1, 2016

(54) DYNAMIC DAMPER DEVICE

(75) Inventor: Kiyohito Murata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 333 days.

(21) Appl. No.: 13/381,672

(22) PCT Filed: Nov. 4, 2010

(86) PCT No.: PCT/JP2010/069632
§ 371 (c)(1),
(2), (4) Date: Dec. 30, 2011

(87) PCT Pub. No.: WO2012/060005
PCT Pub. Date: May 10, 2012

(65) Prior Publication Data
US 2012/0196714 A1    Aug. 2, 2012

(51) Int. Cl.
*F16F 15/12* (2006.01)
*F16F 15/31* (2006.01)

(52) U.S. Cl.
CPC .......... *F16F 15/1206* (2013.01); *F16F 15/31* (2013.01)

(58) Field of Classification Search
CPC .................................................. F16F 15/1206
USPC .......................... 475/343, 347, 302; 74/574.4
See application file for complete search history.

(56) References Cited

U.S. PATENT DOCUMENTS

| 5,551,928 | A  | * | 9/1996  | Sudau ........................... 475/347 |
| 5,863,274 | A  |   | 1/1999  | Jäckel |
| 6,763,743 | B2 |   | 7/2004  | Watanabe et al. |
| 8,523,732 | B2 | * | 9/2013  | Le Moal ....................... 475/347 |
| 2003/0183467 | A1 | | 10/2003 | Kozarekar |
| 2007/0173369 | A1 | * | 7/2007 | Eyraud et al. ................ 475/293 |
| 2008/0167156 | A1 | * | 7/2008 | Lin et al. ..................... 475/149 |

FOREIGN PATENT DOCUMENTS

| JP | 2002 340092 | 11/2002 |
| JP | 2003 314614 | 11/2003 |
| JP | 2006-022890 | 1/2006 |
| JP | 2010 1905   | 1/2010 |
| JP | 2010 164125 | 7/2010 |
| JP | 2011 226494 | 11/2011 |
| WO | WO 2009/004144 A1 | 1/2009 |

OTHER PUBLICATIONS

International Search Report Issued Nov. 30, 2010 in PCT/JP10/69632 Filed Nov. 4, 2010.

* cited by examiner

*Primary Examiner* — Colby M Hansen
*Assistant Examiner* — Stacey Fluhart
(74) *Attorney, Agent, or Firm* — Oblon, McClelland, Maier & Neustadt, L.L.P.

(57) ABSTRACT

A dynamic damper device includes a planetary gear mechanism including plural differentially rotatable rotating elements, an elastic member that couples a rotating shaft rotated by being transmitted with a power with a first rotating element of the planetary gear mechanism, and a rotation control device that is coupled with a rotating element different from the first rotating element of the planetary gear mechanism and controls a rotation of the planetary gear mechanism by adjusting torque acting on the first rotating element. Accordingly, the dynamic damper device achieves an effect that vibration can be appropriately reduced.

16 Claims, 8 Drawing Sheets

| GEAR CHANGE STAGE | 1 | 2 | 3 | 4 | 5 | 6 |
|---|---|---|---|---|---|---|
| Ia | $Ia_1$ | $Ia_2$ | $Ia_3$ | $Ia_4$ | $Ia_5$ | $Ia_6$ |

DYNAMIC DAMPER DEVICE

FIELD

The present invention relates to a dynamic damper device.

BACKGROUND

As a conventional dynamic damper device, for example, Patent Literature 1 discloses a mass dynamic damper device for hybrid vehicle which controls a resonant point by adjusting an apparent inertia mass by controlling torque of an electric motor by controlling a drive of the electric motor to thereby reduce a resonant vibration.

CITATION LIST

Patent Literature

Patent Literature 1: Japanese Patent Application Laid-open No. 2003-314614

SUMMARY

Technical Problem

Incidentally, the mass dynamic damper device for hybrid vehicle described in Patent Literature 1 as described above has a room of further improvement in such as efficiency to adjust the apparent inertia mass, for example.

An object of the present invention, which was made in view of the above circumstances, is to provide a dynamic damper device capable of appropriately reducing vibration.

Solution to Problem

In order to achieve the above mentioned object, a dynamic damper device according to the present invention includes a planetary gear mechanism including a plurality of differentially rotatable rotating elements; an elastic member that couples a rotating shaft rotated by being transmitted with a power with a first rotating element of the planetary gear mechanism; and a rotation control device that is coupled with a rotating element different from the first rotating element of the planetary gear mechanism and controls a rotation of the planetary gear mechanism by adjusting torque acting on the first rotating element.

Further, in the dynamic damper device, it is possible to configure that the rotation control device includes a speed control device that is coupled with a second rotating element different from the first rotating element of the planetary gear mechanism and controls a rotation speed of the second rotating element.

Further, in the dynamic damper device, it is possible to configure that the rotation control device includes a torque control device that is coupled with a third rotating element different from the first rotating element and the second rotating element of the planetary gear mechanism and controls torque acting on the third rotating element.

In order to achieve the above mentioned object, a dynamic damper device according to the present invention includes a planetary gear mechanism including a plurality of differentially rotatable rotating elements; an elastic member that couples a rotating shaft rotated by being transmitted with a power with a first rotating element of the planetary gear mechanism; a speed control device that is coupled with a second rotating element different from the first rotating element and controls a rotation speed of the second rotating element; and a torque control device that is coupled with a third rotating element different from the first rotating element and the second rotating element and controls torque acting on the third rotating element.

Further, in the dynamic damper device, it is possible to configure that a vibration damping control is executed by a speed control by the speed control device and a torque control by the torque control device.

Further, in the dynamic damper device, it is possible to configure that when a torque change of the rotating shaft is less than a predetermined change, the vibration damping control is executed by a speed control of the speed control device, and when a torque change of the rotating shaft is equal to or more than a predetermined change, the vibration damping control is executed by a torque control of the torque control device.

Further, in the dynamic damper device, it is possible to configure that when the vibration damping control is executed, the torque control is switched to the speed control via a period in which the torque control is overlapped with the speed control of the speed control device.

Further, in the dynamic damper device, it is possible to configure that the torque control device is configured to include a brake device or a rotary electric machine coupled with the third rotating element.

Further, in the dynamic damper device, it is possible to configure that the speed control device is configured to include a rotary electric machine coupled with the second rotating element.

Further, in the dynamic damper device, it is possible to configure that the rotation control device is coupled with a second rotating element different from the first rotating element of the planetary gear mechanism, and a third rotating element different from the first rotating element and the second rotating element acts as a reaction force receiver.

Further, in the dynamic damper device, it is possible to configure that the rotating shaft is rotated by being transmitted with a power from an internal combustion engine.

Advantageous Effects of Invention

The dynamic damper device according to the present invention achieves an effect that a vibration can be appropriately reduced.

DESCRIPTION OF EMBODIMENTS

Embodiments according to the present invention will be explained below in detail based on the drawings. Note that present invention is by no means limited by the embodiment. Further, components in the embodiment include components which can be replaced by a person skilled in the art as well as is easy or include substantially the same components.

First Embodiment

Figure 1:
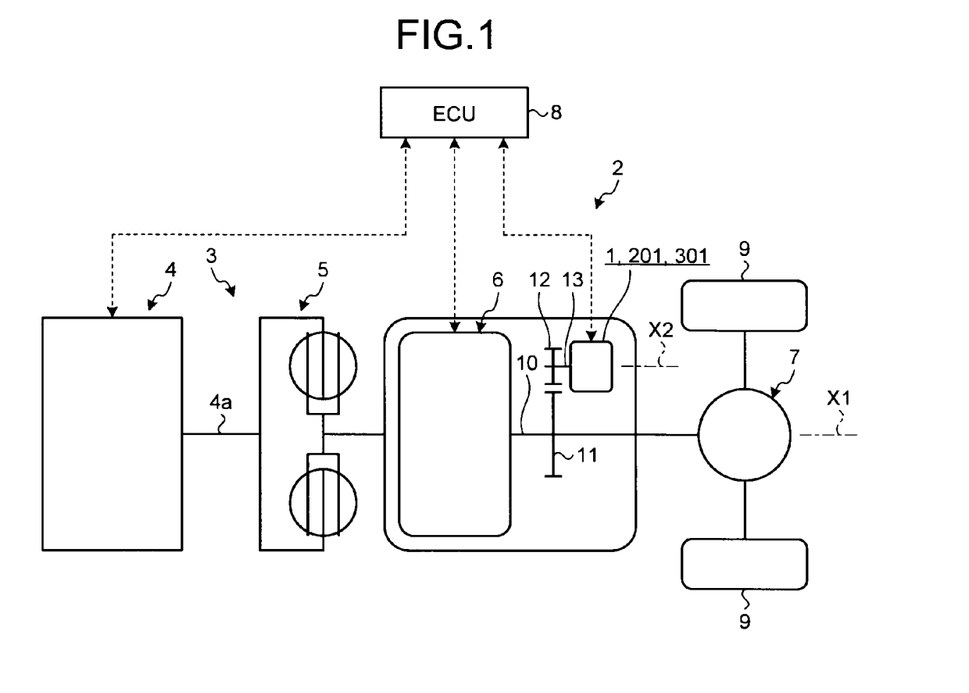
FIG. 1 is a schematic configuration view of a vehicle in which a dynamic damper device according to a first embodiment is mounted.
Figure 2:
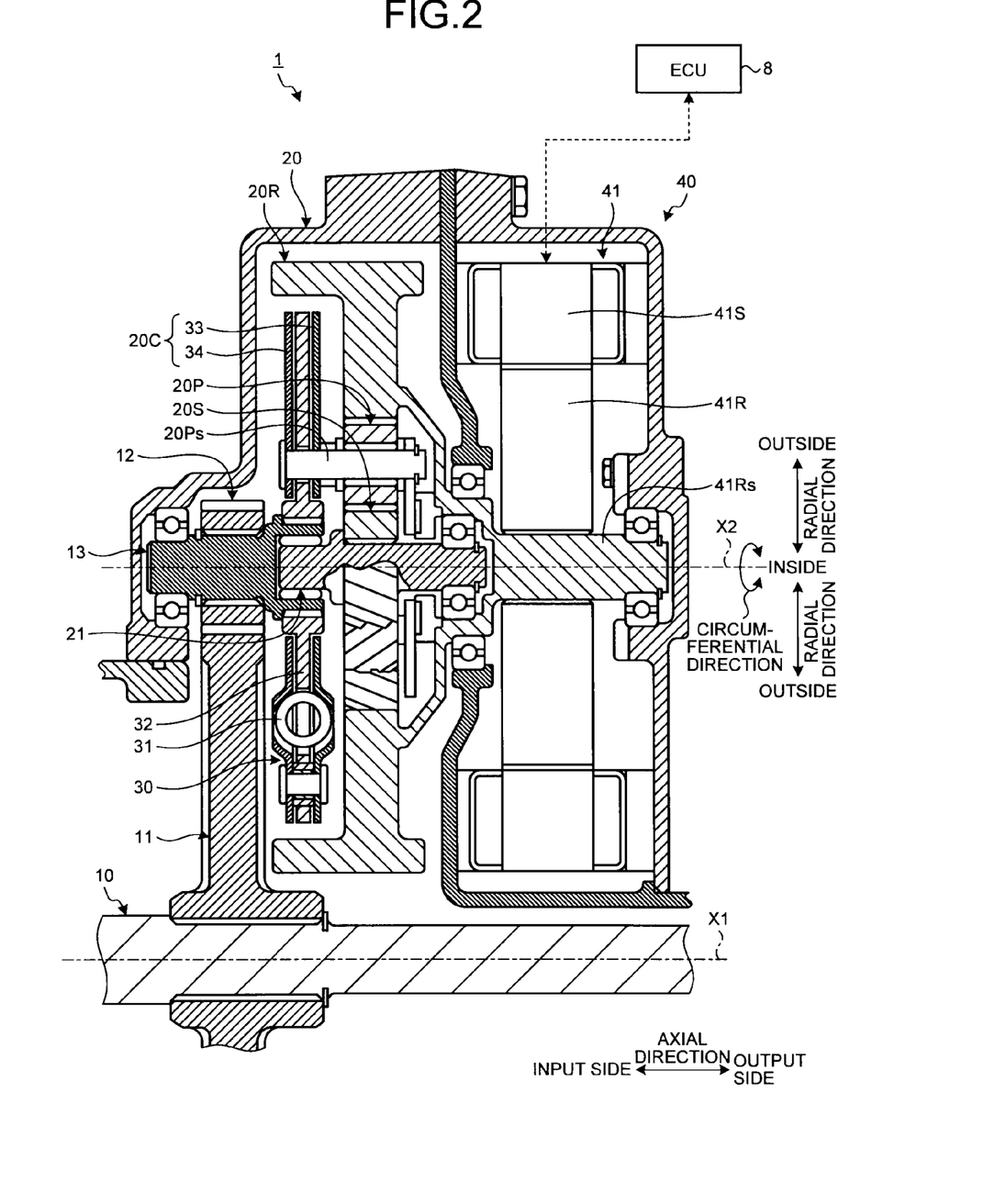
FIG. 2 is a sectional view of a main portion of the dynamic damper device.
Figure 3:
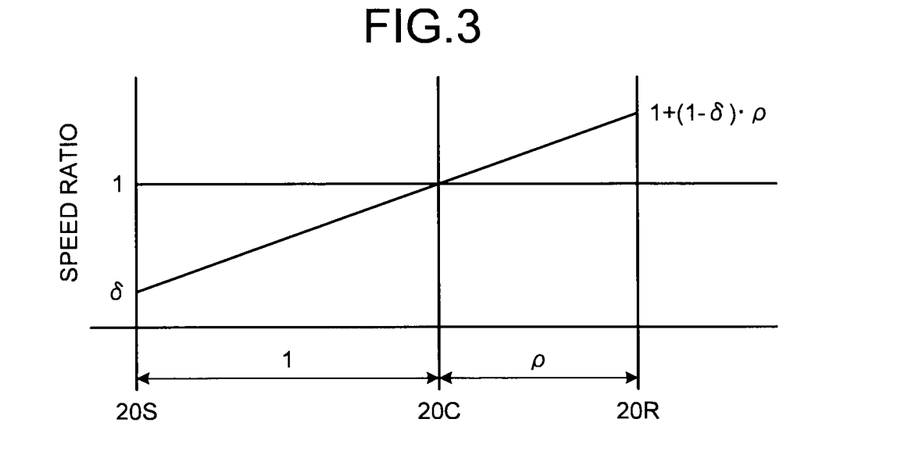
FIG. 3 is an alignment chart of a planetary gear mechanism.
Figure 4:
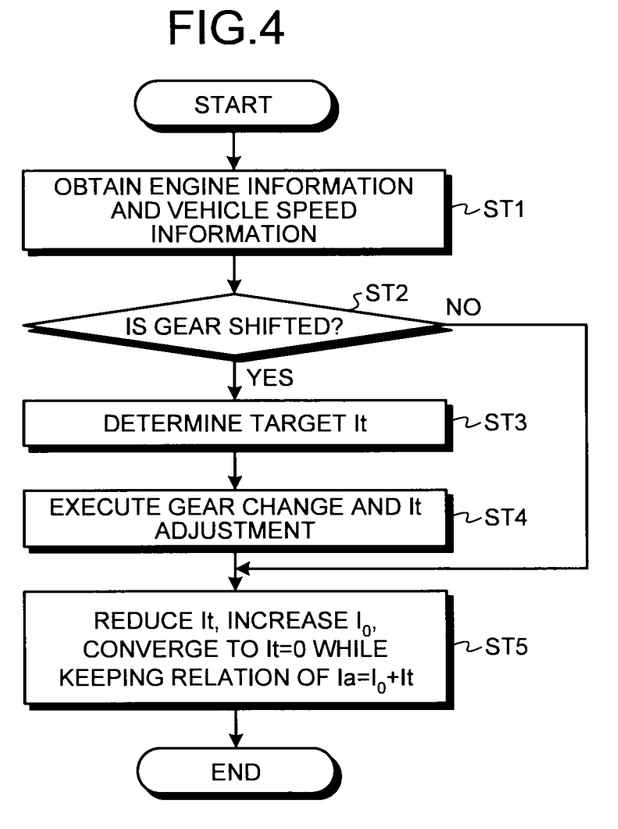
FIG. 4 is a flowchart showing an example of control by an ECU.
Figure 5:
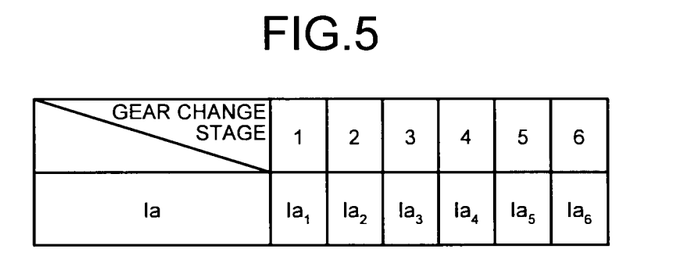
FIG. 5 is a view showing an example of a control map.

FIG. 1 is a schematic configuration view of a vehicle in which a dynamic damper device according to a first embodiment is mounted, FIG. 2 is a sectional view of a main portion of the dynamic damper device, FIG. 3 is an alignment chart of a planetary gear mechanism, FIG. 4 is a flowchart showing an example of control by an ECU, and FIG. 5 is a view showing an example of a control map.

Note that, in the following explanation, unless otherwise particularly noted, a direction along a rotation axis line X2 of a rotating shaft 13 is called an axial direction, a direction orthogonal to the rotation axis line X2, that is, a direction orthogonal to the axial direction is called a radial direction, and a direction about the rotation axis line X2 is called a circumferential direction. Further, in the radial direction, the rotation axis line X2 side is called a radial direction inside and an opposite side is called a radial direction outside. Further, in the axial direction, a side where a drive source is disposed (side where a power is input from the drive source) is called an input side, and an opposite side, that is, a side where drive wheels are disposed (side where a power is input to the drive wheels) is called an output side.

As illustrated in FIG. 1, a dynamic damper device 1 of the embodiment is applied to a vehicle 2 and is a so-called dynamic damper (dynamic vibration absorber) for reducing a vibration using an anti-resonance principle to a resonance point (resonance frequency) of a power train 3 of the vehicle 2. The power train 3 of the vehicle 2 is configured including an engine 4 as an internal combustion engine which is a traveling drive source, a damper 5, a drive system 6 such as transmission and the like, a differential gear 7, and the like. The engine 4, the drive system 6, and the like are controlled by an ECU 8 as a control device. Accordingly, when a crank shaft 4a of the engine 4 is driven in rotation, a drive force of the engine 4 is input to and shifted by the drive system 6 via the damper 5, transmitted to respective drive wheels 9 via the differential gear 7 and the like so that the vehicle 2 can move forward or backward by that the respective drive wheels 9 rotate. Then, the dynamic damper device 1 is disposed to the rotating shaft (speed increasing shaft) 13 which is coupled with a rotating shaft rotated by being transmitted with a power from the engine 4 in the power train 3, here, with an output shaft 10 of the drive system 6 via a drive gear 11, a driven gear 12, and the like and is rotated integrally with the output shaft 10. The rotation axis line X2 of the rotating shaft 13 is disposed appropriately in parallel with a rotation axis line X1 of the output shaft 10.

As illustrated in FIG. 2, since a damper mass vibrates in an inverted phase to a vibration of a specific frequency, which acts on the dynamic damper device 1 from the rotating shaft 13 via springs 31 as elastic members, the dynamic damper device 1 damps (absorbs) and suppresses the vibration. That is, the dynamic damper device 1 can achieve a high vibration damping effect (dynamic damper effect) by that the damper mass resonantly vibrates to the vibration of the specific frequency acting on the dynamic damper device 1 and alternatively absorbs vibration energy and absorbs the vibration.

Then, the dynamic damper device 1 more appropriately reduces the vibration by being provided with a planetary gear mechanism 20, a spring holding mechanism 30 for holding the springs 31, and a rotation control device 40. The dynamic damper device 1 is disposed so that the rotating shaft 13 is inserted inside of the planetary gear mechanism 20, the spring holding mechanism 30, the rotation control device 40, and the like. Here, the ECU 8 is used also as a control device of the rotation control device 40. Note that predetermined positions of the rotating shaft 13, the planetary gear mechanism 20, and the like described above are supported by a case via bearings and the like.

In the planetary gear mechanism 20, the dynamic damper device 1 of the embodiment uses one of plural rotating elements of the planetary gear mechanism 20 as a rotation control element as well as other one rotating element acts as a reaction force receiving element. In the dynamic damper device 1, one of the plural rotating elements of the planetary gear mechanism 20 other than the rotation control element and the reaction force receiving element acts as an input element to which a power from the engine 4 is input.

Further, in the dynamic damper device 1, since the planetary gear mechanism 20 is coupled with and elastically supported by the rotating shaft 13 via the springs 31, the respective rotating elements act as an inertial mass member for generating an inertial moment in the damper mass, that is, in the dynamic damper, and the springs 31 act as members for adjusting twist rigidity of the dynamic damper. Note that, in the following explanation, when the inertial mass of the damper mass is made variable, it is assumed that this includes a case that an apparent inertial mass is made variable by making a rotation of the damper mass variable unless otherwise particularly noted.

Specifically, the planetary gear mechanism 20 is configured including plural rotating elements which can differentially rotate each other and rotation centers of the rotating elements are disposed coaxially with the rotation axis line X2. The planetary gear mechanism 20 is a so-called single pinion type planetary gear mechanism and is configured including, as rotating elements, a sun gear 20S which is an outer tooth gear, a ring gear 20R which is inner tooth gear disposed coaxially with the sun gear 20S, and a carrier 20C for holding plural pinion gears 20P meshed with the sun gear 20S and the ring gear 20R so that the pinion gears 20P can rotate on their axes as well as revolve. In the planetary gear mechanism 20 of the embodiment, the carrier 20C is a first rotating element and corresponds to the input element, the ring gear 20R is a second rotating element different from the first rotating element and corresponds to the rotation control element, and the sun gear 20S is a third rotating element different from the first rotating element and the second rotating element and corresponds to the reaction force receiving element.

The carrier 20C is formed in an annular sheet shape and supports the pinion gears 20P which are outer tooth gears to a pinion shaft 20Ps so that the pinion gears 20P rotate on their axes as well as revolve. The carrier 20C is configured including a first side plate 33 and a second side plate 34. The first side plate 33 and the second side plate 34 configure the carrier 20C as well as are used also as hold members for holding the springs 31 of the spring holding mechanism 30 which will be described later. The carrier 20C constitutes an input member of the planetary gear mechanism 20. The carrier 20C is relatively rotatably coupled with the rotating shaft 13 via the springs 31 and the like of the spring holding mechanism 30. A power transmitted from the engine 4 to the rotating shaft 13 via the output shaft 10, the drive gear 11, and the driven gear 12 is transmitted (input) to the carrier 20C via the spring holding mechanism 30. The ring gear 20R is formed in an annular sheet shape and has a gear is formed on an inner peripheral surface. The ring gear 20R is coupled with the rotation control device 40. The sun gear 20S is formed in an annular sheet shape and has a gear is formed on an outer peripheral surface. The sun gear 20S is formed to an outer peripheral surface of a columnar center axis 21 and an inside end in the radial direction is integrally rotatably coupled with the center axis 21 via a spline engagement section and the like. One end side (input side) of the center axis 21 in the axial direction is engaged with the rotating shaft 13 and relatively rotatably supported, and other end side (output side) in the radial direction is engaged with a rotor shaft 41Rs and relatively rotatably supported. The sun gear 20S and the center axis 21 constitute a reaction force receiving member.

The spring holding mechanism 30 includes the springs 31 and a center plate 32, the first side plate 33 and the second side plate 34 as the hold member for holding the springs 31, and center axis lines are disposed coaxially with the rotation axis line X2. The springs 31 elastically support the carrier 20C which is the input element of the planetary gear mechanism 20 to the rotating shaft 13, and plural springs are held along the circumferential direction by the center plate 32, the first side plate 33 and the second side plate 34. The springs 31 relatively rotatably couple the rotating shaft 13 with the carrier 20C. That is, in the dynamic damper device 1, the springs 31 are interposed between the rotating shaft 13 and the planetary gear mechanism 20.

The center plate 32, the first side plate 33 and the second side plate 34 hold the springs 31 so as to be able to mutually transmit a power and are formed in an annular sheet shape coaxially with the rotation axis line X2, respectively. The center plate 32 is supported on an outer peripheral surface of the rotating shaft 13, and a radial direction inside end is integrally rotatably coupled with the rotating shaft 13 via a spline engaging section and the like. The first side plate 33 and the second side plate 34 are disposed on both the sides of the center plate 32 in the axial direction, respectively and used also as the carrier 20C as described above. The first side plate 33 and the second side plate 34 are relatively rotatably disposed to the center plate 32 in a state that they are integrated across the center plate 32 via pins, spacers, and the like. Then, the first side plate 33 and the second side plate 34 are fixed with one end side of the pinion shaft 20Ps. The pinion shaft 20Ps passes through the center plate 32 so as to be able to allow a relative rotation with the first side plate 33, the second side plate 34, and the center plate 32, and the pinion gears 20P are supported to the other end side so as to rotate on their axes. Then, the springs 31 are held between the center plate 32 and the first side plate 33, and the second side plate 34 in a rotating direction (circumferential direction).

In the spring holding mechanism 30 configured as described above, the springs 31 are interposed between the center plate 32 rotated integrally with the rotating shaft 13, and the first side plate 33 and the second side plate 34 used also as the carrier 20C with respect to the rotating direction (circumferential direction). As a result, the spring holding mechanism 30 can relatively rotatably couple the rotating shaft 13 with the carrier 20C via the springs 31 and the like. The power (variation component) transmitted from the engine 4 to the rotating shaft 13 is input (transmitted) to the first side plate 33 and the second side plate 34 used also as the carrier 20C via the center plate 32 and the springs 31. During the period, the respective springs 31 are elastically deformed in response to a magnitude of the transmitted power while held between the center plate 32 and the first side plate 33, the second side plate 34 with respect to the rotating direction.

The rotation control device 40 is coupled with a rotating element different from the carrier 20C as a first rotating element of the planetary gear mechanism 20, here, with the ring gear 20R as described above. The rotation control device 40 controls a rotation of the planetary gear mechanism 20 by adjusting torque acting on the planetary gear mechanism 20. The rotation control device 40 is configured including a motor 41.

The motor 41 is coupled with the ring gear 20R and controls a rotation of the ring gear 20R. The motor 41 includes a stator 41S as a stator and a rotor 41R as a rotor. The stator 41S is fixed to the case and the like. The rotor 41R is disposed inside of the stator 41S in the radial direction and integrally rotatably coupled with the rotor shaft 41Rs. The rotor shaft 41Rs is rotatably supported to the case as well as can rotate integrally with the ring gear 20R and here formed integrally with the ring gear 20R. The motor 41 is a rotary electric machine (motor generator) which has a function as a motor for converting a power supplied from a battery via an inverter and the like to a mechanical power and also a function as a generator for converting an input mechanical power to an electric power. The motor 41 can control a rotation (speed) of the ring gear 20R by that the rotor 41R is driven in rotation. A drive of the motor 41 is controlled by the ECU 8.

Here, the ECU 8 controls drives of respective sections of the vehicle 2 and is an electronic circuit mainly composed of a known micro computer having a CPU, ROM, RAM, and an interface. The ECU 8 controls the engine 4, the drive system 6, and the like as well as controls the drive of the motor 41 of the rotation control device 40.

The dynamic damper device 1 configured as described above cancels, damps (absorbs), and suppresses a vibration of a specific frequency acting on the planetary gear mechanism 20 as the damper mass from the rotating shaft 13 via the springs 31 by that the damper mass vibrates in an inverted phase. Accordingly, the dynamic damper device 1 can suppress a vibration caused by, for example, a first engine explosion generated in the power train 3 and thus can reduce vibration noise and improve fuel consumption.

At the time, since the ECU 8 executes a vibration damping control by controlling the drive of the motor 41 and controls a rotation of the planetary gear mechanism 20, the dynamic damper device 1 can appropriately set the vibration of the inverted phase in the dynamic damper device 1 in response to a vibration generated in the power train 3 so that a vibration can be appropriately reduced in a wide operation region.

That is, in the dynamic damper device 1, the ECU 8 controls the drive of the motor 41 and variably controls the rotation of the ring gear 20R. With the operation, the dynamic damper device 1 executes an inertial mass control for controlling the apparent inertial mass of the damper mass variable by making rotations of the ring gear 20R and the sun gear 20S of the planetary gear mechanism 20 variable and making an inertia force acting on the damper mass including the ring gear 20R, the sun gear 20S and the like variable. For example, since the dynamic damper device 1 increases the apparent inertial mass of the damper mass by increasing a rotation speed of the ring gear 20R which is a relatively large damper mass an effect similar to a case that an actual inertial mass is increased can be obtained.

More Specifically, the ECU 8 of the embodiment executes the vibration damping control by controlling the drive of the motor 41 of the rotation control device 40, adjusting torque acting on the carrier 20C which is the input element of the planetary gear mechanism 20, and controlling the rotation of the planetary gear mechanism 20. With the operation, when the dynamic damper device 1 executes the vibration damping control, since the dynamic damper device 1 can execute a vibration damping control having a high responsiveness as explained below, the dynamic damper device 1 can execute the control so that, for example, an efficiency of the power train 3 and the vibration noise are optimized.

Here, the carrier 20C, the ring gear 20R, and the sun gear 20S of the planetary gear mechanism 20 operate at a rotation speed (corresponding to a rotation number) based on an alignment chart shown in FIG. 3. FIG. 3 is a speed graph showing the relative relation among rotation speeds (rotation number) of the respective rotating elements of the planetary gear mechanism 20 by straight lines, wherein a vertical axis shows the speed ratio (corresponding to a relative rotation number ratio) of respective rotations of the sun gear 20S, the carrier 20C, and the ring gear 20R, and speed ratios of the respective rotating elements are disposed, respectively so that intervals of the respective rotating elements along a horizontal axis become intervals in response to tooth number ratios of the ring gear 20R and the sun gear 20S. Here, in FIG. 3, the carrier 20C which is the input element is used as a reference, and the speed ratio of a rotation of the carrier 20C is set to 1. Further, a gear ratio $\rho$ shown in FIG. 3 is a gear ratio of the planetary gear mechanism 20. That is, when an interval between the sun gear 20S and the carrier 20C is set to "1", an interval between the carrier 20C and the ring gear 20R corresponds to the gear ratio $\rho$.

Then, in the overall planetary gear mechanism 20, when the apparent inertial mass (hereinafter, unless otherwise particularly noted, called "inertial mass speed term") by making rotation speeds of the respective rotating elements variable is shown by an overall inertial mass speed term $I_0$, the overall inertial mass speed term $I_0$ can be expressed by the following expression (1) using an inertial mass speed term $Is_0$ of the sun gear 20S, an inertial mass speed term $Ic_0$ of the carrier 20C, and an inertial mass speed term $Ir_0$ of the ring gear 20R. In other words, the overall inertial mass speed term $I_0$ is the apparent inertial mass in the overall planetary gear mechanism 20 by a rotation speed control.

$$I_0 = Is_0 + Ic_0 + Ir_0 \quad (1)$$

The inertial mass speed term $Is_0$ of the sun gear 20S, the inertial mass speed term $Ic_0$ of the carrier 20C, and the inertial mass speed term $Ir_0$ of the ring gear 20R can be expressed by the following expressions (2) to (4) using an inertial mass Is of the sun gear 20S, an inertial mass Ic of the carrier 20C, and an inertial mass Ir of the ring gear 20R when, for example, the speed ratio is 1.

$$Is_0 = \delta^2 \cdot Is \quad (2)$$

$$Ic_0 = Ic \quad (3)$$

$$Ir_0 = (1+(1-\delta)\cdot\rho)^2 \cdot Ir \quad (4)$$

Accordingly, the overall inertial mass speed term $I_0$ can be expressed by the following expression (5) based on the expressions (1) to (4).

$$I_0 = \delta^2 \cdot Is + Ic + (1+(1-\delta)\cdot\rho)^2 \cdot Ir \quad (5)$$

Then, in the overall planetary gear mechanism 20, when an apparent inertial mass (hereinafter, unless otherwise particularly noted, called "inertial mass torque term") by torque acting when the rotation speeds of the respective rotating elements change is shown by an overall inertial mass torque term It, the overall inertial mass torque term It can be expressed by the following expression (6) using carrier torque (torque acting on the carrier 20C from the planetary gear mechanism 20 main body side) Tc acting on the carrier 20C as the input element when the rotation speeds of the respective rotating elements change and an angular speed change amount $d\omega/dt$ in the overall planetary gear mechanism 20 by the carrier torque Tc. In other words, the overall inertial mass torque term It is the apparent inertial mass in the overall planetary gear mechanism 20 by the torque control.

$$It = Tc/(d\omega/dt) \quad (6)$$

Here, the carrier torque Tc can be expressed by the following expression (7) using a torque term (acceleration torque term caused by an inertial mass) Tk due to accelerations generated by the change of rotation speeds of the respective rotating elements.

$$Tc = Tk \quad (7)$$

Then, in the overall planetary gear mechanism 20, when the apparent inertial mass by making the rotations of the respective rotating elements variable is set as an overall inertial mass (overall inertial mass of the damper mass of the dynamic damper device 1) Ia, the overall inertial mass Ia can be expressed by the following expression (8) using the overall inertial mass speed term $I_0$ and the overall inertial mass torque term It.

$$Ia = I_0 + It \quad (8)$$

A natural frequency fa as the dynamic damper device 1 at the time can be expressed by the following expression (9) using a spring constant Kd of the springs 31 and the overall inertial mass Ia.

$$fa = (\sqrt{(Kd/Ia)})/2\pi \quad (9)$$

Accordingly, the dynamic damper device 1 can appropriately adjust the natural frequency fa in response to the vibration generated in the power train 3 by adjusting the overall inertial mass Ia. At the time, the dynamic damper device 1 can adjust the overall inertial mass Ia and can adjust the natural frequency fa with a good responsiveness in comparison with, for example, a case that the overall inertial mass speed term $I_0$ is adjusted by adjusting the carrier torque Tc, controlling the rotation of the planetary gear mechanism 20, and adjusting the overall inertial mass torque term It. This is because that since the speeds of the respective rotating elements correspond to an integration term of torque, the overall inertial mass torque term It can be more promptly changed than the overall inertial mass speed term $I_0$.

In the dynamic damper device 1 of the embodiment, the sun gear 20S and the center axis 21 constitute the reaction force receiver when the vibration damping control is executed. That is, in the dynamic damper device 1, since the sun gear 20S and the center axis 21 are used as the reaction force receiver and the ECU 8 controls an output of the motor 41 of the rotation control device 40 as the vibration damping control, inertial masses of the sun gear 20S and the center axis 21 become a reaction force, the torque term Tk due to the accelerations generated by the changes of rotation speeds of the respective rotating elements is adjusted, and the carrier torque Tc is adjusted. With the operation, in the dynamic damper device 1, the overall inertial mass torque term It and the overall inertial mass Ia are adjusted and finally the natural frequency fa is adjusted. As a result, since the dynamic damper device 1 can execute the vibration damping control with a high responsiveness, even when a resonance point (resonance frequency) in the power train 3 abruptly changes in, for example, a gear shift and the like, the dynamic damper device 1 can adjust the natural frequency fa to an appropriate natural frequency fa with a good responsiveness to the change so that control can be promptly executed with a good responsiveness so that the efficiency and the vibration noise of the power train 3 are optimized. In the vehicle 2, although it is also possible to suppress a vibration, by, for example, that a lock-up clutch of a torque converter (not illustrated) is turned OFF (placed is a release state), in the case, there is a possibility that the fuel consumption is deteriorated. However, in the dynamic damper device 1 of the present invention, a vibration can be appropriately suppressed in addition to that the deterioration of fuel consumption caused by turning OFF the lock-up clutch is suppressed.

Here, since the ECU 8 executes the vibration damping control by the speed control by the rotation control device 40 and the torque control the rotation control device 40, the dynamic damper device 1 of the embodiment can execute the vibration damping control by appropriately selectively using an inertial mass control by the speed control and an inertial mass control by the torque control in response to an operation state, thereby an accuracy of the vibration damping control can be improved. The speed control by the rotation control device 40 (motor 41) is control for adjusting the overall inertial mass speed term $I_0$ by controlling the rotation speed of the motor 41 and adjusting the overall inertial mass Ia and the natural frequency fa. The torque control by the rotation control device 40 (the motor 41) is control for adjusting the overall inertial mass torque term It by controlling the motor output torque of the motor 41 and adjusting the overall inertial mass Ia and the natural frequency fa.

For example, the dynamic damper device 1 preferably executes the vibration damping control by the speed control of the rotation control device 40 when a torque change of the rotating shaft 13 is less than a predetermined change and executes the vibration damping control by the torque control of the rotation control device 40 when the torque change of the rotating shaft 13 is equal to or more than the predetermined change. The case that the torque change of the rotating shaft 13 is less than the predetermined change is typically an operation state that the resonance point in the power train 3 does not largely change, for example, a case that the vehicle 2 is in a steady operation state and the like. The case that the torque change of the rotating shaft 13 is equal to or more than the predetermined change is typically an operation state that the resonance point in the power train 3 largely changes, for example, a case at a transient time at which a gear shift is executed by the drive system 6, and the like. With the operation, the dynamic damper device 1 can improve an accuracy of the vibration damping control as well as can suppress a deterioration of fuel consumption so that the accuracy of the vibration damping control can be improved and the deterioration of fuel consumption can be suppressed at the same time.

That is, in the dynamic damper device 1, when the torque change of the rotation shaft 13 is less than the predetermined change such as when the vehicle 2 steadily travels and the like, the ECU 8 executes the vibration damping control by the speed control of the motor 41, adjusts the overall inertial mass speed term $I_0$, adjusts the overall inertial mass Ia and the natural frequency fa, and reduces a vibration. As a result, in an operation state that the torque change of the rotating shaft 13 is less than the predetermined change and the resonance point does not largely change such as when the vehicle 2 is in the steady operation and the like, the dynamic damper device 1 can execute the vibration damping control by the speed control in which the fuel consumption is less deteriorated so that the deterioration of fuel consumption can be suppressed.

In contrast, in the dynamic damper device 1, when the torque change of the rotating shaft 13 is equal to or more than the predetermined change such as when the vehicle 2 shifts a gear and when the vehicle 2 is in a transient operation, the ECU 8 executes the vibration damping control by the torque control of the motor 41, adjusts the overall inertial mass torque term It, adjusts the overall inertial mass Ia and the natural frequency fa, and reduces a vibration. As a result, in a state in which the torque change of the rotating shaft 13 is equal to or more than the predetermined change and the resonance point is largely changed such as when the vehicle 2 changes a gear and when the vehicle 2 is in a transient operation, and the like, the dynamic damper device 1 can execute the vibration damping control by the torque control with the high responsiveness so that the accuracy of the vibration damping control can be improved.

Note that when the dynamic damper device 1 executes the vibration damping control by the torque control, the dynamic damper device 1 may secure responsiveness by the torque control at the beginning of the vibration damping control and thereafter may switch the torque control to the speed control when the vibration damping control is finished. That is, when the vibration damping control is executed, the dynamic damper device 1 may cause the ECU 8 to finally switch the torque control to the speed control via a period in which the torque control and the speed control are overlapped. In the case, since the dynamic damper device 1 can suppress the deterioration of fuel consumption in addition to that the responsiveness of the vibration damping control is secured, the accuracy of the vibration damping control can be improved and the deterioration of fuel consumption can be suppressed at the same time more appropriately.

Further, in the dynamic damper device 1, since the vibration damping control can be executed by the speed control and the torque control executed by the single motor 41 as the rotation control device 40 by that the sun gear 20S and the like constitute the reaction force receiver as described above when the vibration damping control is executed, an increase of manufacturing cost can be suppressed and further an increase of the device in size can be suppressed.

Next, an example of the control by the ECU 8 will be explained referring to a flowchart of FIG. 4. Note that these control routines are repeatedly executed in a control cycle of several milliseconds to several tens of milliseconds.

First, the ECU 8 obtains engine information such as a number of engine rotations of the engine 4 and the like, speed information of the vehicle 2, and the like (ST1).

Next, the ECU 8 determines whether or not the vehicle 2 shifts a gear based on the information obtained at ST1 using various methods (ST2).

When the ECU 8 determines that the vehicle 2 shifts the gear (ST2: Yes), the ECU 8 determines the overall inertial mass torque term It as a target (ST3). In the case, the ECU 8 calculates the overall inertial mass Ia as the target in response to a gear shift stage (gear shift ratio) after the gear shift based on, for example, a control map exemplified in FIG. 5. The control map exemplified in FIG. 5 describes the correspondence relation between respective gear shift stages (1, 2, 3, . . . ) and the overall inertial mass Ia ($Ia_1$, $Ia_2$, $Ia_3$, . . . ) as a target, is previously set based on an actual vehicle evaluation and the like, and stored in a storage unit of the ECU 8. Then, the ECU 8 calculates rotation number of the ring gear 20R at present, the overall inertial mass speed term $I_0$, and the like in response to a speed of the vehicle 2 at present, a rotation number of the motor 41 and calculates the overall inertial mass torque term It as a target from the target overall inertial mass Ia as the target, the overall inertial mass speed term $I_0$ at present, and the like using, for example, the following expression (10).

$$It = Ia - I_0 \qquad (10)$$

Then, the ECU 8 actually executes a gear shift by controlling the drive system 6 as well as controls an output of the motor 41 using the sun gear 20S and a center axis 21 as the reaction force receiver so that an actual overall inertial mass torque term It is converged to the target overall inertial mass torque term It as the target based on the overall inertial mass torque term It as the target. With the operation, the ECU 8 adjusts the carrier torque Tc, converges the overall inertial mass Ia to the overall inertial mass Ia as the target, and adjusts the natural frequency fa to an appropriate natural frequency fa in response to a resonance point after the gear shift (ST4).

Then, the ECU 8 reduces the overall inertial mass torque term It by the control of the motor 41 while keeping the relation of $Ia = I_0 + It$, whereas the ECU 8 increases the overall inertial mass speed term $I_0$ by the speed control of the motor 41, finally establishes $It = 0$, $I_0 = Ia$ (ST5), finishes the present control cycle, and shifts to a next control cycle. Note that in the case, when, for example, rotation speeds of the rotating elements are increased by the speed control, the ECU 8 can increase the rotation speeds of the rotating elements and achieve target rotation speeds by executing control so that the motor 41 outputs torque slightly larger than the torque required by the torque control.

When the ECU 8 determines at ST2 that the vehicle 2 does not execute the gear shift (ST2: No), the ECU 8 shifts to ST5 and executes subsequent processes.

To explain an example, when, for example, the vehicle 2 executes a gear shift from a fifth speed to a sixth speed, an inertial mass necessary to antiresonance changes from $Ia_5$ to $Ia_6$ as shown in the control map exemplified in FIG. 5. In the case, the carrier torque Tc necessary to the antiresonance can be expressed by, for example, the following expression (11). The dynamic damper device 1 is placed in an antiresonance state to the vibration generated in the power train 3 and can reduce the vibration by causing the carrier torque Tc calculated by the expression (11) to act on the carrier 20C by the torque control of the motor 41. The carrier torque Tc calculated here corresponds to torque for realizing the overall inertial mass torque term It as the target.

$$Tc = (Ia_6 - Ia_5) \cdot (d\omega/dt) \qquad (11)$$

At the time, the ECU 8 controls the ring gear 20R in a speed increase direction simultaneously with a gear shift by the speed control of the motor 41 so that $I_0 = Ia_6$ is established. An apparent sun gear torque Ts of the sun gear 20S in the case can be expressed by, for example, the following expression (12) using an inertial mass Is of the sun gear 20S when a speed ratio is 1 and an angular speed change amount $d\omega s/dt$ of the sun gear 20S when a speed of the ring gear 20R changes.

$$Ts = Is \cdot (d\omega s/dt) \qquad (12)$$

Then, in the dynamic damper device 1, the carrier torque Tc, by which antiresonance is established in the case, that is, when the ring gear 20R is controlled in the speed increase direction by the speed control of the motor 41 simultaneously with the gear shift so that $I_0 = Ia_6$ is established, can be expressed by the following expression (13) from expressions (11) and (12) using a number of sun gear teeth Zs and a number of ring gear teeth Zr.

$$Tc = Ts \cdot (1 + Zr/Zs) \qquad (13)$$

The ECU 8 reduces the It term of $Ia = I_0 + It$, whereas increases the $I_0$ term by the speed control and the torque control of the motor 41 while keeping a condition of expression (13), finally establish $It = 0$, $I_0 = Ia$, and shifts from a transient state to a steady state.

According to the dynamic damper device 1 according to the embodiment explained above, there are provided the planetary gear mechanism 20 including the plural differentially rotatable rotating elements, the springs 31 for coupling the rotating shaft 13 rotated by being transmitted with a power with the carrier 20C which is the first rotating element of the planetary gear mechanism 20, and the rotation control device 40 coupled with the rotating element different from the carrier 20C of the planetary gear mechanism 20 for controlling the rotation of the planetary gear mechanism 20 by adjusting the torque acting on the carrier 20C. Accordingly, the dynamic damper device 1 can improve the responsiveness of the vibration damping control and can appropriately reduce a vibration. As a result, the dynamic damper device 1 can reduce so-called NVH (Noise-Vibration-Harshness) and can enlarge an operation region in which, for example, the lock-up clutch of the torque converter can be turned ON (can be placed in an engaged state), thereby the fuel consumption can be improved.

Second Embodiment

Figure 6:
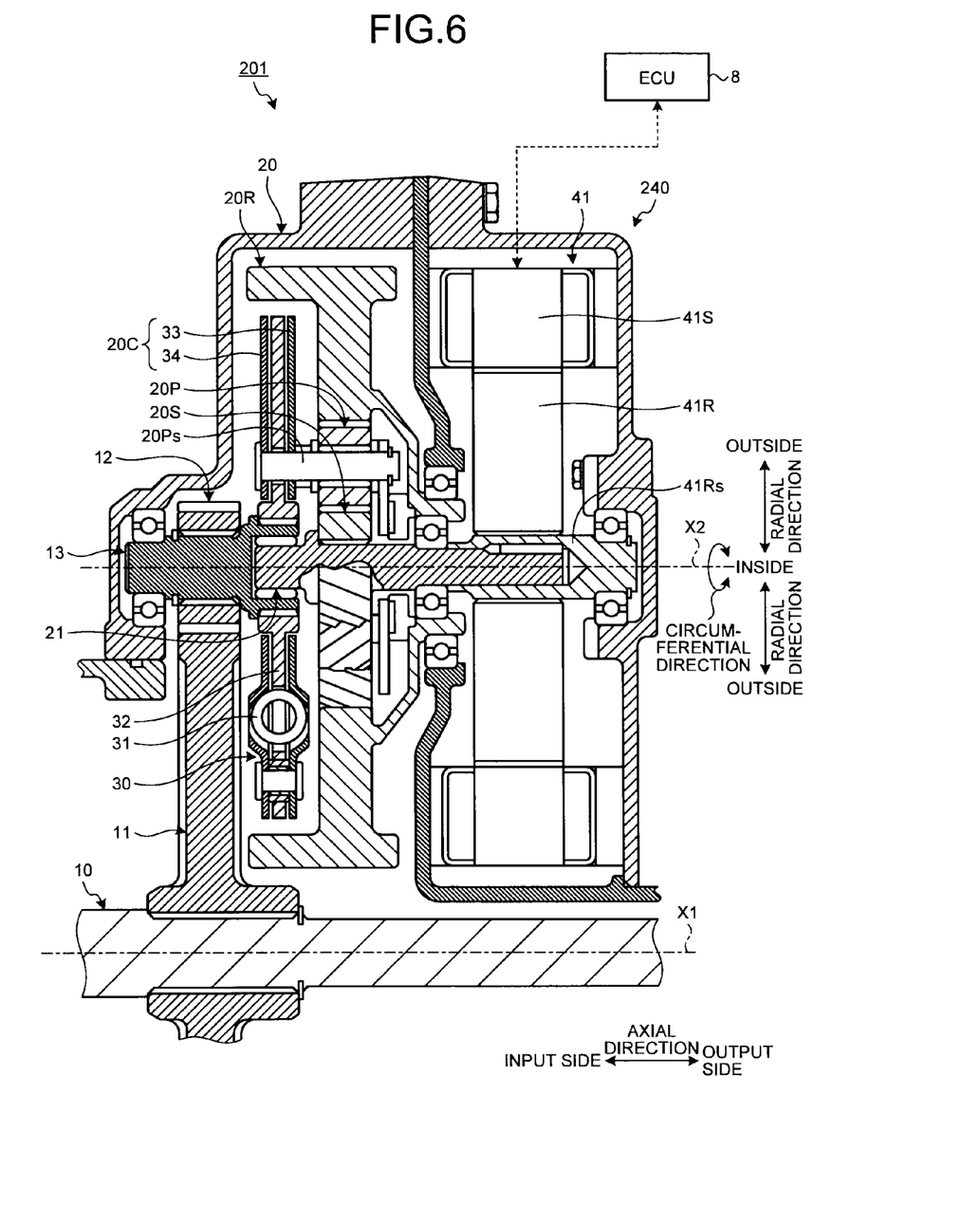
FIG. 6 is a sectional view of a main portion of a dynamic damper device according to a second embodiment.

FIG. 6 is a sectional view of a main portion of a dynamic damper device according to a second embodiment. A disposition of a rotation control device of the dynamic damper device according to the second embodiment is different from the first embodiment. In addition to the above-mentioned, a duplicate explanation as to a configuration, an operation, and an effect, which are common to the embodiment described above, will not be repeated as much as possible (this is the same as to an embodiment explained below).

A dynamic damper device 201 illustrated in FIG. 6 more appropriately reduces a vibration by including a planetary gear mechanism 20, a spring holding mechanism 30 for holding springs 31, and a rotation control device 240. The rotation control device 240 is configured including a motor 41, and the motor 41 of the embodiment is coupled with a sun gear 20S.

In the planetary gear mechanism 20 of the embodiment, a carrier 20C is a first rotating element and corresponds to an input element, the sun gear 20S is a second rotating element different from the first rotating element and corresponds to a rotation control element, and the ring gear 20R is a third rotating element different from the first rotating element and the second rotating element and corresponds to a reaction force receiving element. That is, the ring gear 20R constitutes a reaction force receiving member. The sun gear 20S is coupled with the rotation control device 240.

The motor 41 of the rotation control device 240 is coupled with the sun gear 20S and controls a rotation of the sun gear 20S. A rotor 41R of the motor 41 is integrally rotatably coupled with a rotor shaft 41Rs. The rotor shaft 41Rs is rotatably supported to a case as well as can be integrally rotated with the sun gear 20S. Here, the rotor shaft 41Rs is integrally rotatably coupled with a center axis 21 via a spline engagement section and the like and integrally rotatably coupled with the sun gear 20S via the center axis 21. The motor 41 can control a rotation (speed) of the sun gear 20S by that the rotor 41R is driven in rotation.

In the dynamic damper device 201 of the embodiment, a ring gear 20R whose mass tends to become larger than the sun gear 20S constitutes a reaction force receiver when a vibration damping control is executed. That is, in the dynamic damper device 201, since the ECU 8 controls an output of the motor 41 of the rotation control device 240 as the vibration damping control using the ring gear 20R as the reaction force receiver, an inertial mass of the ring gear 20R becomes a reaction force, a torque term Tk due to accelerations generated by a change of rotation speeds of the respective rotating elements is adjusted, and carrier torque Tc is adjusted. With the operation, in the dynamic damper device 201, an overall inertial mass torque term It and an overall inertial mass Ia are adjusted and finally an natural frequency fa is adjusted. As a result, the dynamic damper device 201 can execute the vibration damping control having a high responsiveness and a good accuracy and can promptly execute the control with a good responsiveness so that an efficiency and vibration noise of a power train 3 is optimized.

According to the dynamic damper device 201 according to the embodiment explained above, responsiveness of the vibration damping control can be improved and a vibration can be appropriately reduced. Then, in the dynamic damper device 201, since the ring gear 20R whose mass tends to become relatively large in the planetary gear mechanism 20 is used as the reaction force receiving member and the sun gear 20S whose mass tends to become relatively small is used as the rotation control element, the motor 41 can be reduced in size and an increase of size of the device can be suppressed.

That is, a case in which the carrier 20C is fixed is assumed, a motor output torque Tm of the motor 41 can be expressed by the following expression (14) using an inertial mass Is of the sun gear 20S, an inertial mass Ir of the ring gear 20R, an angular speed change amount dωs/dt of the sun gear 20S, and an angular speed change amount dωr/dt of the ring gear 20R.

$$Tm = Ir \cdot (d\omega r/dt) + Is \cdot (d\omega s/dt) \tag{14}$$

As apparent also from the expression (14), the dynamic damper device 201 can effectively make use of inertia reaction force when an inertial mass directly coupled with the motor 41 is small and an inertial mass of the reaction force receiving member is large. As a result, the dynamic damper device 201 can reduce a size of the motor 41 and can improve mountability.

Third Embodiment

Figure 7:
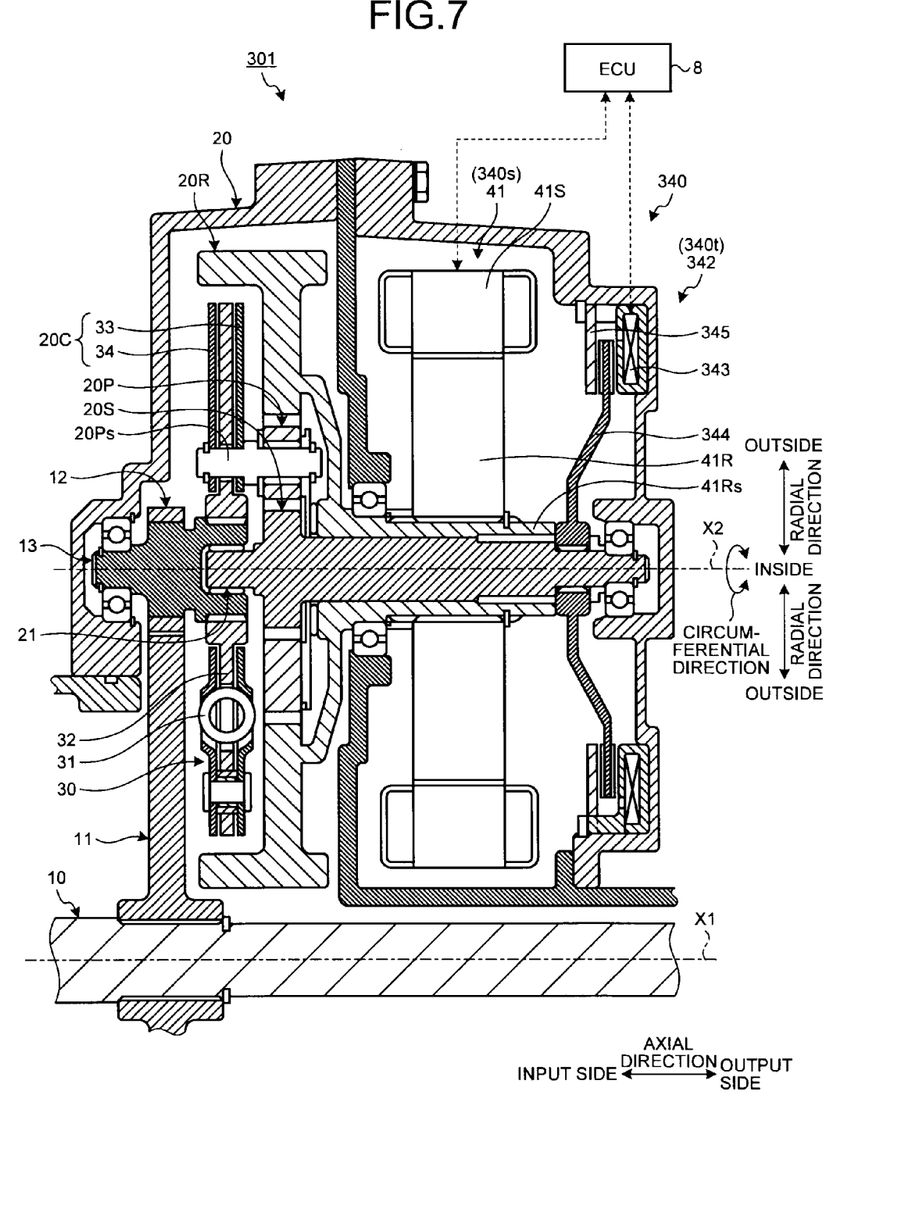
FIG. 7 is a sectional view of a main portion of a dynamic damper device according to a third embodiment.

FIG. 7 is a sectional view of a main portion of a dynamic damper device according to a third embodiment. A configuration of a rotation control device of the dynamic damper device according to the third embodiment is different from the first embodiment.

A dynamic damper device 301 illustrated in FIG. 7 more appropriately reduces a vibration by including a planetary gear mechanism 20, a spring holding mechanism 30 for holding springs 31, and a rotation control device 340.

The rotation control device 340 has a speed control device 340s and a torque control device 340t. The speed control device 340s is coupled with a ring gear 20R which is a second rotating element and controls a rotation speed of the ring gear 20R. The torque control device 340t is coupled with a sun gear 20S which is a third rotating element and controls torque acting on the sun gear 20S. With the configuration, the rotation control device 340 adjusts torque acting on the planetary gear mechanism 20 and controls the rotation of the planetary gear mechanism 20.

In the planetary gear mechanism 20 of the embodiment, a carrier 20C is a first rotating element and corresponds to an input element, the ring gear 20R is a second rotating element different from the first rotating element and corresponds to a rotation control element, and the sun gear 20S is a third rotating element different from the first rotating element and the second rotating element and corresponds to a reaction force receiving element. Here, the torque control device 340t constitutes a reaction force receiver.

The speed control device 340s is configured including a motor 41 as a rotary electric machine coupled with the ring gear 20R. The torque control device 340t is configured including a brake device or a rotary electric machine coupled with the sun gear 20S, here an electromagnetic brake 342 as the brake device.

The motor 41 can control a rotation (speed) of the ring gear 20R by that a rotor 41R is driven in rotation. Note that since the motor 41 has the same configuration as that explained above, its explanation will not be repeated.

The electromagnetic brake 342 is configured including an electromagnetic coil 343, a sun gear side rotation member 344, and a press piston 345. The electromagnetic brake 342 can brake the sun gear side rotation member 344 rotated integrally with the sun gear 20S at predetermined brake torque (brake torque) as well as can adjust a magnitude of the brake torque.

The electromagnetic coil 343 generates an electromagnetic force by being supplied with a current. The sun gear side rotation member 344 is formed in an annular sheet shape coaxially with a rotation axis line X2. The sun gear side rotation member 344 is supported to an outer peripheral surface of a center axis 21, and an inside end in a radial direction is integrally rotatably coupled with the center axis 21 via a spline engagement section and the like. Here, the sun gear 20S is formed integrally with the center axis 21. Accordingly, the sun gear side rotation member 344 is integrally rotatably coupled with the sun gear 20S. The electromagnetic coil 343 is disposed at a position confronting in an axial direction with respect to an outside end in the radial direction of the sun gear side rotation member 344 and fixed to a case and the like. The press piston 345 is formed in an annular sheet shape coaxially with the rotation axis line X2. The press piston 345 is supported to the case and the like on a side opposite to the electromagnetic coil 343 across the sun gear side rotation member 344 with respect to the axial direction. An outside end of the press piston 345 in the radial direction is relatively movably supported along the axial direction via a spline engagement section and the like. Here, the electromagnetic brake 342 is disposed in the order of the press piston 345, the sun gear side rotation member 344, and the electromagnetic coil 343 from an input side to an output side in the axial direction. A drive of the electromagnetic brake 342 is controlled by the ECU 8.

In the electromagnetic brake 342, when the electromagnetic coil 343 is supplied a current, the press piston 345 is attracted to the sun gear side rotation member 344 side along the axial direction by an electromagnetic force of the electromagnetic coil 343 and presses the sun gear side rotation member 344 to the electromagnetic coil 343 side along the axial direction. Then, the electromagnetic brake 342 frictionally brakes a rotation of the sun gear side rotation member 344 by a friction force generated to contact surfaces in contact with abutment surfaces in the vicinity of the sun gear side rotation member 344 and the press piston 345, and the electromagnetic coil 343.

At the time, since the current supplied to the electromagnetic coil 343 is adjusted by the ECU 8, the electromagnetic brake 342 adjusts a magnitude of brake torque (brake torque) for braking a rotation of the sun gear side rotation member 344. Typically, in the electromagnetic brake 342, a press force by the press piston 345 is increased as the current supplied to the electromagnetic coil 343 increases so that the brake torque becomes large. In the electromagnetic brake 342, when brake torque is 0 (when a supply current is 0), the sun gear side rotation member 344 is placed in a perfectly released state in which the sun gear side rotation member 344 is perfectly released, and as the brake torque (supply current) becomes larger, the sun gear side rotation member 344 is placed in a perfectly engaged state via a semi-engaged state (slip state).

Then, the dynamic damper device 301 executes a vibration damping control by controlling a rotation of the planetary gear mechanism 20 by that the ECU 8 controls drives of the motor 41 which is the speed control device 340s and the electromagnetic brake 342 which is the torque control device 340t and adjusts torque acting on the carrier 20C which is the input element of the planetary gear mechanism 20 by a speed control by the speed control device 340s and a torque control by the torque control device 340t. With the operation, when the dynamic damper device 301 executes the vibration damping control, a vibration damping control having a high responsiveness can be executed as explained below, and control can be executed with a good responsiveness so that, for example, an efficiency of the power train 3 and vibration noise are optimized.

In the case, in a state that rotation speeds of the respective rotating elements do not change, motor torque Tm (in other words, ring gear torque Tr acting on the ring gear 20R) by the motor 41 can be expressed by the following expression (15) using brake torque Tb (in other words, sun gear torque Ts acting on the sun gear 20S) by the electromagnetic brake 342, a number of sun gear teeth Zs, and a number of ring gear teeth Zr.

$$Tm = Tb \cdot (Zr/Zs) \quad (15)$$

Accordingly, in the state that the rotation speeds of the respective rotating elements do not change, carrier torque Tc can be expressed by the following expression (16).

$$Tc = Tb \cdot (1 + Zr/Zs) \quad (16)$$

Then, in a state that the rotation speeds of the respective rotating elements change, the carrier torque Tc can be expressed by the following expression (17).

$$Tc = Tk + Tb \cdot (1 + Zr/Zs) \quad (17)$$

Then, the dynamic damper device 301 can adjust an overall inertial mass Ia and adjusts an natural frequency fa with a good responsiveness in comparison with a case that, for example, an overall inertial mass speed term $I_0$ is adjusted by adjusting the carrier torque Tc, and adjusting an overall inertial mass torque term It by controlling the rotation of the planetary gear mechanism 20.

In the dynamic damper device 301 of the embodiment, brake torque Tb corresponding to a reaction force (load torque) of the sun gear 20S is adjusted as a reaction force control and carrier torque Tc is adjusted by that the ECU 8 controls an output of the motor 41 which is the speed control device 340s as well as controls a drive of the electromagnetic brake 342 which is the torque control device 340t as the vibration damping control. With the operation, in the dynamic damper device 301, the overall inertial mass torque term It and the overall inertial mass Ia are adjusted and finally the natural frequency fa is adjusted. As a result, the dynamic damper device 301 can execute the vibration damping control having the high responsiveness and can promptly execute control with a good responsiveness so that an efficiency and vibration noise of the power train 3 is optimized.

Then, in the dynamic damper device 301, since the brake torque Tb can be secured sufficiently large in the expression (17), even if a torque term Tk due to an acceleration generated by a change of rotation speeds of the respective rotating elements is small, appropriate carrier torque Tc can be sufficiently secured. Accordingly, since the dynamic damper device 301 does not require an instantly large output of the motor 41 in a torque control, the motor 41 can be reduced in size and an increase of the device in size can be suppressed. As a result, the dynamic damper device 301 can improve mountability.

Here, since the ECU 8 executes the vibration damping control by the speed control by the speed control device 340s and the torque control by the torque control device 340t, the dynamic damper device 301 of the embodiment can execute the vibration damping control by appropriately selectively using an inertial mass control by the speed control and an inertial mass control by the torque control in response to an operation state, thereby an accuracy of the vibration damping control can be improved. The speed control by the speed control device 340s is control for adjusting the overall inertial mass speed term $I_0$ by controlling the rotation speed of the motor 41 and adjusting the overall inertial mass Ia and the natural frequency fa. The torque control by the torque control device 340t is control for adjusting the overall inertial mass torque term It by controlling the brake torque Tb of the electromagnetic brake 342 and adjusting the overall inertial mass Ia and the natural frequency fa.

Typically, the ECU 8 executes the speed control by controlling the output of the motor 41. With the operation, the dynamic damper device 301 can suppress a deterioration of fuel consumption. In contrast, the ECU 8 controls the output of the motor 41 as well as controls brake torque of the electromagnetic brake 342, thereby executing the torque control. With the operation, the dynamic damper device 301 can improve responsiveness of the vibration damping control.

For example, when a torque change of the rotating shaft 13 is less than a predetermined change, the dynamic damper device 301 preferably executes the vibration damping control by the speed control of the speed control device 340s, and when the torque change of the rotating shaft 13 is equal to or more than the predetermined change, the dynamic damper device 301 preferably executes the vibration damping control by the torque control of the torque control device 340t. With the operation, the dynamic damper device 301 can improve the accuracy of the vibration damping control and can suppress the deterioration of fuel consumption at the same time. That is, in an operation state in which the torque change of the rotating shaft 13 is less than the predetermined change and a resonance point does not largely change such as when the vehicle 2 is in a steady operation and the like, the dynamic damper device 301 can execute the vibration damping control by the speed control in which fuel consumption is less deteriorated so that the deterioration of fuel consumption can be suppressed. In contrast, in an operation state in which the torque change of the rotating shaft 13 is equal to or more than the predetermined change and the resonance point largely changes such as when the vehicle 2 shifts a gear and when the vehicle 2 is in a transient operation, the dynamic damper device 301 can execute the vibration damping control by the torque control having the high responsiveness so that the accuracy of the vibration damping control can be improved.

Note that, when the vibration damping control is executed, the dynamic damper device 301 may cause the ECU 8 to finally switch the torque control to the speed control via a period in which the torque control and the speed control are overlapped. In the case, since the dynamic damper device 301 can suppress the deterioration of fuel consumption in addition to that the responsiveness of the vibration damping control is secured, the accuracy of the vibration damping control can be improve and the deterioration of fuel consumption can be suppressed at the same time more appropriately.

Further, in the dynamic damper device 301, the ECU 8 can execute the same control as the control explained in the flowchart of FIG. 4. When, for example, rotation speeds of the rotating elements are increased by the speed control at ST5, the ECU 8 can increase the rotation speeds of the rotating elements and make the rotation speeds to target rotation speeds by controlling the motor 41 so that the motor 41 outputs torque slightly larger than the torque required by the torque control. In the case, it is sufficient that the ECU 8 controls the motor torque Tm by the motor 41 so as to satisfy, for example, the following expression (18). In the expression (18), α satisfies (α>0).

$$Tm = Tb \cdot (Zr/Zs) + \alpha \qquad (18)$$

According to the dynamic damper device 301 according to the embodiment explained above, the responsiveness of the vibration damping control can be improved, thereby a vibration can be appropriately reduced. Then, the dynamic damper device 301 includes the speed control device 340s coupled with the ring gear 20R for controlling the rotation speed of the ring gear 20R and the torque control device 340t coupled with the sun gear 20S for controlling the torque acting on the sun gear 20S. Accordingly, the dynamic damper device 301 can improve a stability of performance as well as can realize a reduction in size of the motor 41, a suppression of manufacturing cost, an energy saving, an improvement of fuel consumption, and the like.

Note that, in the above explanation, although the torque control device 340t has been explained assuming that it is configured including the electromagnetic brake 342 as the brake device coupled with the sun gear 20S, the torque control device 340t may be configured including a motor generator (not illustrated) as a rotary electric machine coupled with the sun gear 20S in place of the electromagnetic brake 342. In the case, the dynamic damper device 301 adjusts the sun gear torque Ts acting on the sun gear 20S by controlling a drive of the motor generator so as to be able to adjust the carrier torque Tc, thereby the natural frequency fa can be finally adjusted. At the time, when the motor generator adjusts the sun gear torque Ts, the dynamic damper device 301 can also collect energy by regeneration by the motor generator, thereby a further improvement of fuel consumption and the like can be realized.

Fourth Embodiment

Figure 8:
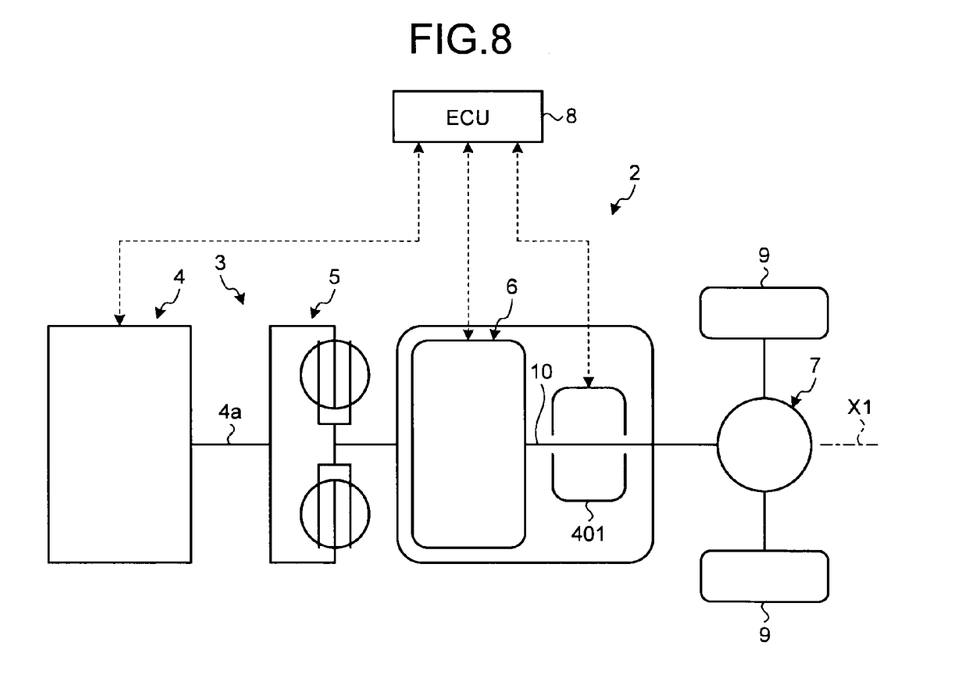
FIG. 8 is a schematic configuration view of a vehicle to which a dynamic damper device according to a fourth embodiment is mounted.
Figure 9:
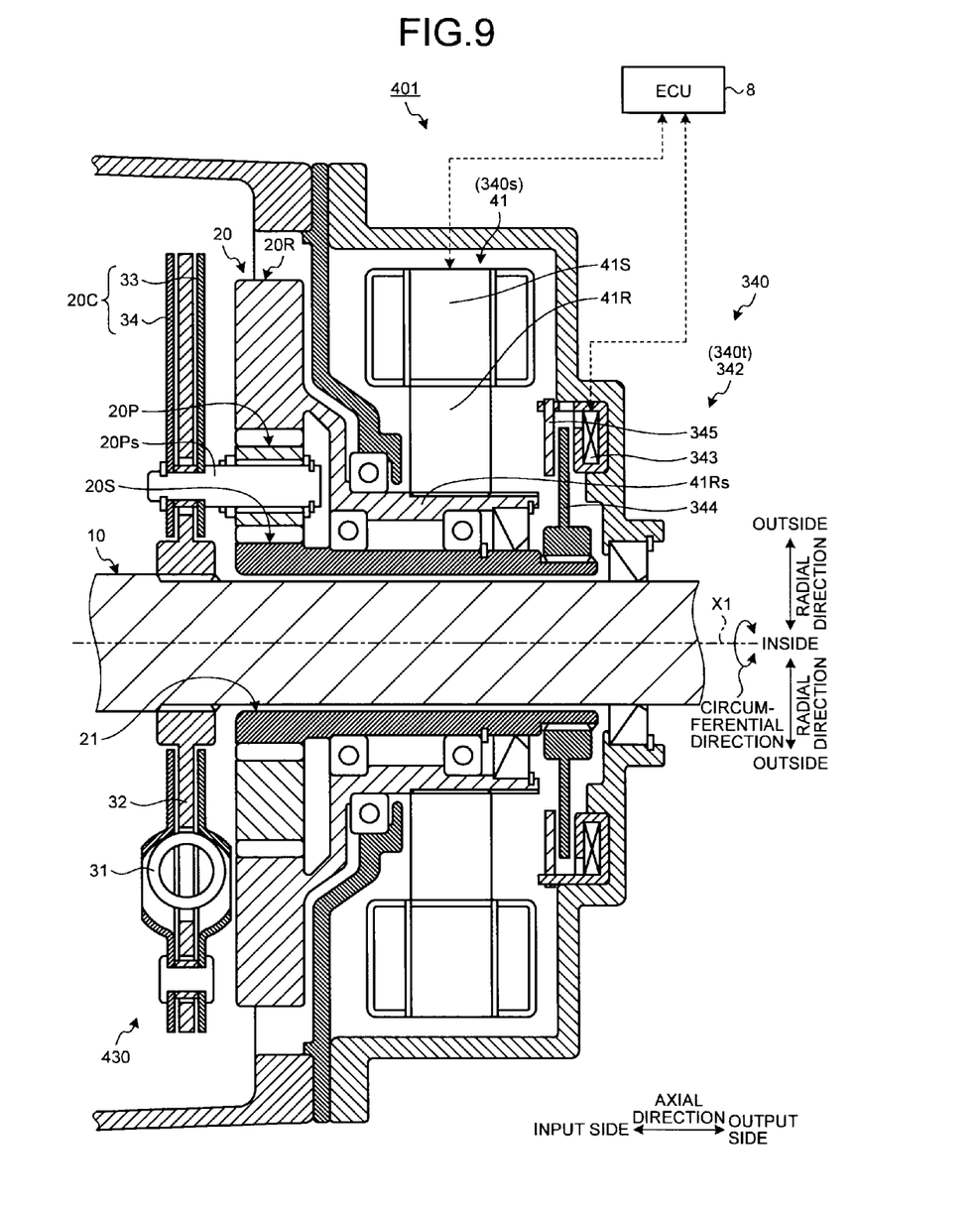
FIG. 9 is a sectional view of a main portion of a dynamic damper device.

FIG. 8 is a schematic configuration view of a vehicle in which a dynamic damper device according to a fourth embodiment is mounted, and FIG. 9 is a sectional view of a main portion of the dynamic damper device. A position at which the dynamic damper device according to the fourth embodiment is disposed is different from the third embodiment.

Note that, here, a direction along a rotation axis line X1 of an output shaft 10 is called an axial direction, a direction orthogonal to the rotation axis line X1, that is, a direction orthogonal to the axial direction is called a radial direction, and a direction about the rotation axis line X1 is called a circumferential direction. Further, in the radial direction, the rotation axis line X1 side is called a radial direction inside and an opposite side is called a radial direction outside. Further, in the axial direction, a side where a drive source is disposed (side where a power is input from the drive source) is called an input side, and an opposite side, that is, a side where drive wheels are disposed (side where a power is input to the drive wheels) is called an output side.

In a power train 3, a dynamic damper device 401 illustrated in FIG. 8 and FIG. 9 is disposed to a rotating shaft which is rotated by being transmitted with a power from an engine 4, here, to the output shaft 10 of a drive system 6. The dynamic damper device 401 damps (absorbs) and suppresses a vibration of a specific frequency, which acts on the dynamic damper device 401 from the output shaft 10 via springs 31 as elastic members by that a damper mass vibrates in an inverted phase to the vibration.

The dynamic damper device 401 more appropriately reduces a vibration by including a planetary gear mechanism 20, a spring holding mechanism 430 for holding the springs 31, and a rotation control device 340. The dynamic damper device 401 is disposed so that the output shaft 10 is inserted inside of the planetary gear mechanism 20, the spring holding mechanism 430, the rotation control device 340, and the like.

The springs 31 of the spring holding mechanism 430 of the embodiment elastically support a carrier 20C which is an input element of the planetary gear mechanism 20 to the output shaft 10. The springs 31 relatively rotatably couple the output shaft 10 with the carrier 20C. That is, in the dynamic damper device 401, the springs 31 are interposed between the output shaft 10 and the planetary gear mechanism 20. Here, a center plate 32 is supported to an outer peripheral surface of the output shaft 10, and a radial direction inside end is integrally rotatably coupled with the output shaft 10 via a spline engagement section and the like. In the spring holding mechanism 430, the springs 31 are interposed between the center plate 32, which is rotated integrally with the output shaft 10, and a first side plate 33 and a second side plate 34 which are used also as the carrier 20C with respect to a rotating direction (circumferential direction). As a result, the spring holding mechanism 430 can relatively rotatably couple the output shaft 10 with the carrier 20C via the springs 31 and the like.

A power (variation component), which is transmitted from the engine 4 to the output shaft 10, is input (transmitted) to the first side plates 33 and the second side plate 34 which are used also as the carrier 20C via the center plate 32 and the springs 31. During the period, the respective springs 31 are elastically deformed in response to a magnitude of the transmitted power while being held between the center plate 32, and the first side plates 33 and the second side plate 34 with respect to the rotating direction. Note that, here, since configurations of the planetary gear mechanism 20, the rotation control device 340, and the like are approximately the same as the dynamic damper device 301 of the third embodiment, their explanation will not be repeated.

According to the dynamic damper device 401 according to the embodiment explained above, responsiveness of a vibration damping control can be improved and a vibration can be appropriately reduced. Then, since the dynamic damper device 401 is directly disposed to the output shaft 10 of the drive system 6, the device can be more reduced in size and mountability can be improved.

Note that the dynamic damper devices according to the embodiments of the present invention described above are not limited to the embodiments described above and can be variously modified within a scope described in claims. The dynamic damper device according to the embodiment may be configured by combining plural embodiments explained above.

Although the above explanation has been made assuming that the ECU 8 is used also as the control device of the speed control device and the control device of the torque control device, control devices may be individually provided, respectively and the respective control devices may be configured to deliver information such as detected signals, drive signals, control commands, and the like between them and the ECU 8 each other.

In the above explanation, the planetary gear mechanism has been explained in, for example, the first embodiment and the like assuming that the carrier is the first rotating element and the ring gear and the sun gear are the second rotating elements, the planetary gear mechanism is not limited thereto. In the planetary gear mechanism, for example, the ring gear may be the first rotating element and the sun gear may be the first rotating element. In planetary gear mechanism, for example, the carrier may be a second rotating element, the ring gear may be a third rotating element, the sun gear may be a first rotating element, and further other combination may be employed.

INDUSTRIAL APPLICABILITY

As described above, the dynamic damper device according to the present invention is preferably applied to a dynamic damper device mounted in various vehicles.

REFERENCE SIGNS LIST 1, 201, 301, 401 DYNAMIC DAMPER DEVICE
2 VEHICLE
3 POWER TRAIN
4 ENGINE (INTERNAL COMBUSTION ENGINE)
8 ECU
10 OUTPUT SHAFT (ROTATING SHAFT)
13 ROTATING SHAFT
20 PLANETARY GEAR MECHANISM
20C CARRIER
20S SUN GEAR
20R RING GEAR
30, 430 SPRING HOLDING MECHANISM
31 SPRING (ELASTIC MEMBER)
40, 240, 340 ROTATION CONTROL DEVICE
41 MOTOR (ROTARY ELECTRIC MACHINE)
340t TORQUE CONTROL DEVICE
340s SPEED CONTROL DEVICE
342 ELECTROMAGNETIC BRAKE (BRAKE DEVICE)

The invention claimed is:

1. A dynamic damper device comprising:
a rotating shaft that is coupled with an output shaft of a drive system of a vehicle via a drive gear and a driven gear and that is rotated integrally with the output shaft;
a planetary gear mechanism including a plurality of differentially rotatable rotating elements and rotation centers of the rotating elements are disposed coaxially with a rotation center of the rotating shaft;
an elastic member that couples the rotating shaft with a first rotating element of the planetary gear mechanism and a rotation center of the elastic member is disposed coaxially with the rotation center of the rotation shaft;
a rotation control device that is coupled with a second rotating element different from the first rotating element of the planetary gear mechanism, controls a rotation of the planetary gear mechanism by adjusting torque acting on the first rotating element, and a rotation center of the rotation control device is disposed coaxially with the rotation center of the rotating shaft; and
a controller, that controls the rotation control device to execute vibration damping control, wherein
the rotation control device includes a speed control device that is coupled with the second rotating element different from the first rotating element of the planetary gear mechanism and controls a rotation speed of the second rotating element, and a torque control device that is coupled with a third rotating element different from the first rotating element and the second rotating element of the planetary gear mechanism and controls torque acting on the third rotating element, and
the controller executes the vibration damping control by speed control by the speed control device and torque control by the torque control device.

2. The dynamic damper device according to claim 1, wherein when a torque change of the rotating shaft is less than a predetermined change, the vibration damping control is executed by a speed control of the speed control device, and when a torque change of the rotating shaft is equal to or more than a predetermined change, the vibration damping control is executed by a torque control of the torque control device.

3. The dynamic damper device according to claim 2, wherein when the vibration damping control is executed, the torque control is switched to the speed control via a period in which the torque control is overlapped with the speed control of the speed control device.

4. The dynamic damper device according to claim 2, wherein the torque control device is configured to include a brake device or a rotary electric machine coupled with the third rotating element.

5. The dynamic damper device according to claim 1, wherein when the vibration damping control is executed, the torque control is switched to the speed control via a period in which the torque control is overlapped with the speed control of the speed control device.

6. The dynamic damper device according to claim 1, wherein the torque control device is configured to include a brake device or a rotary electric machine coupled with the third rotating element.

7. The dynamic damper device according to claim 1, wherein the speed control device is configured to include a rotary electric machine coupled with the second rotating element.

8. The dynamic damper device according to claim 1, wherein a power that rotates the rotating shaft is transmitted from an internal combustion engine.

9. The dynamic damper device according to claim 1, wherein a vibration damping control is executed by a speed control by the speed control device and a torque control by the torque control device.

10. The dynamic damper device according to claim 1, wherein the second rotating device includes a ring gear in mesh with a plurality of pinion gears, the first rotating device includes a carrier that holds the pinion gears, and the third rotating device includes a sun gear in mesh with the pinion gears.

11. The dynamic damper device according to claim 1, wherein the torque control device includes an electromagnetic brake.

12. The dynamic damper device according to claim 1, wherein the drive gear is coaxial with the output shaft, the driven gear is coaxial with the rotating shaft, and the drive gear is in mesh with the driven gear.

13. A dynamic damper device comprising:
a rotating shaft that is coupled with an output shaft of a drive system of a vehicle via a drive gear and a driven gear and that is rotated integrally with the output shaft;
a planetary gear mechanism including a plurality of differentially rotatable rotating elements and rotation centers of the rotating elements are disposed coaxially with a rotation center of the rotating shaft;
an elastic member that couples the rotating shaft with a first rotating element of the planetary gear mechanism and a rotation center of the elastic member is disposed coaxially with the rotation center of the rotation shaft;
a rotation control device that is coupled with a second rotating element different from the first rotating element of the planetary gear mechanism, controls a rotation of the planetary gear mechanism by adjusting torque acting on the first rotating element, the second rotating element rotating integrally with the rotating shaft, and a rotation center of the rotation control device is disposed coaxially with the rotation center of the rotating shaft; and
a controller, that controls the rotation control device to execute vibration damping control, wherein
the rotation control device includes a speed control device that is coupled with the second rotating element different from the first rotating element of the planetary gear mechanism and controls a rotation speed of the second rotating element, and a torque control device that is coupled with a third rotating element different from the first rotating element and the second rotating element of the planetary gear mechanism and controls torque acting on the third rotating element, and
the controller executes the vibration damping control by speed control by the speed control device and torque control by the torque control device.

14. The dynamic damper device according to claim 13, wherein the torque control device includes an electromagnetic brake.

15. The dynamic damper device according to claim 13, wherein the drive gear is coaxial with the output shaft, the driven gear is coaxial with the rotating shaft, and the drive gear is in mesh with the driven gear.

16. A dynamic damper device comprising:
a planetary gear mechanism including a plurality of differentially rotatable rotating elements and rotation centers of the rotating elements are disposed coaxially with a rotation center of an output shaft of a drive system of a vehicle;
an elastic member holding mechanism that couples the output shaft with a first rotating element of the planetary gear mechanism and a rotation center of the elastic member holding mechanism is disposed coaxially with the rotation center of the output shaft;
a rotation control device that is coupled with a second rotating element different from the first rotating element of the planetary gear mechanism, controls a rotation of the planetary gear mechanism by adjusting torque acting on the first rotating element, and a rotation center of the rotation control device is disposed coaxially with the rotation center of the output shaft; and
a controller that controls the rotation control device to execute vibration damping control, wherein
the rotation control device includes a speed control device that is coupled with the second rotating element different from the first rotating element of the planetary gear mechanism and controls a rotation speed of the second rotating element, and a torque control device that is coupled with a third rotating element and controls torque acting on the third rotating element,
the controller executes the vibration damping control by speed control by the speed control device and torque control by the torque control device, and
the torque control device includes an electromagnetic brake.

* * * * *